Patented Apr. 19, 1949

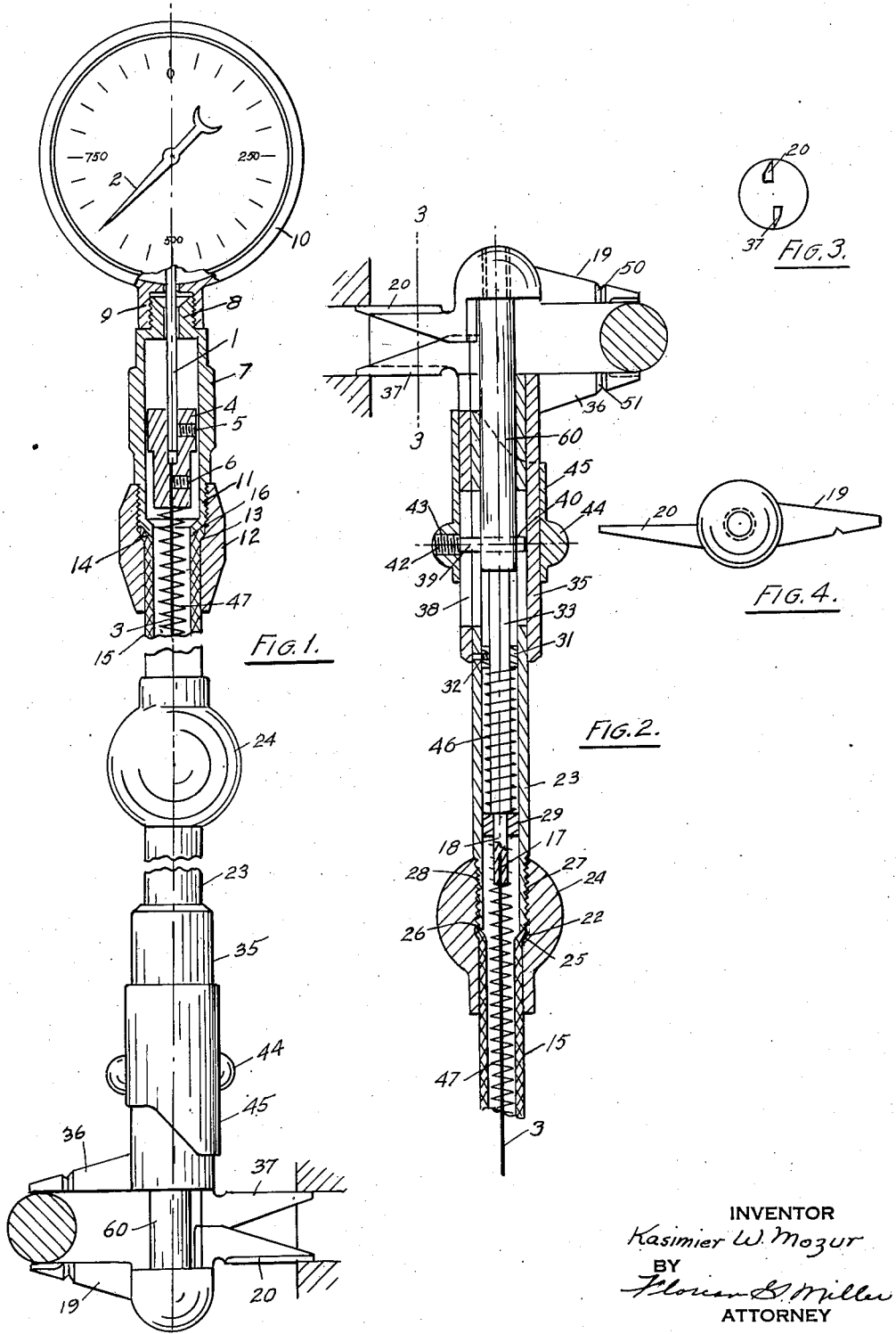

2,467,847

UNITED STATES PATENT OFFICE 2,467,847

MEASURING DEVICE EXTENSION

Kasimier W. Mozur, Erie, Pa.

Application February 12, 1948, Serial No. 7,974

7 Claims. (Cl. 33—147)

This invention relates generally to measuring instruments and more particularly to extensions for connection to measuring instruments having a longitudinally movable measuring arm wherein exact measurements may be taken at remote and inaccessible points.

No means has heretofore been provided for measuring inside and outside diameters and for other inside and outside measurements in spaces which do not permit the use of conventional measuring devices. There are many places where a caliper micrometer cannot be used because of the space allowed for entering the measuring device to a position where the surfaces are to be measured.

It is, accordingly, an object of my invention to provide an extension for a measuring device which is simple in construction, economical in cost, economical in manufacture and efficient in use.

Another object of my invention is to provide an extension for use in conjunction with a measuring device having a longitudinally movable measuring arm which may be utilized in accurately determining inside and outside dimensions at points remote from the measuring device.

Another object of my invention is to provide an extension for a measuring device which is flexible to permit measurements to be taken when the extension is disposed in an arcuate turn.

Other objects of my invention will become evident from the following detailed description, taken in conjunction with the accompanying drawings, in which Fig. 1 is a side elevational view with a part thereof in vertical section for better illustration of my novel extension for a measuring device;

Fig. 2 is a vertical sectional view of the measuring end of the extension shown in Fig. 1;

Fig. 3 is a view taken on the line 3—3 of Fig. 2; and

Fig. 4 is a top plan view of the extension shown in Fig. 2.

The extension shown in the drawings is for particular use with my all purpose measuring device for which I have made application for patent, Serial Number 736,537, I show a longitudinally extending measuring arm which is shown in Fig. 1 of the drawings and is designated as 1. Movement of the measuring arm 1 causes rotation of the indicating member 2 thereby indicating the measurement of an inside or an outside diameter in accordance with the movement of the measuring arm 1, this being described in my previously mentioned application for patent. My novel extension may be used with any measuring device which has a longitudinally movable measuring arm.

Referring now to the drawings, Figs. 1, 2, 3 and 4 show a comparatively stiff wire or cable 3 attached to the measuring arm 1 by a bored cylindrical connecting member 4, the connecting member 4 being attached to the measuring arm 1 by set screw 5 and to the cable 3 by set screw 6. A sleeve 7 has a reduced threaded portion 8 for engagement with the threaded portion 9 of a measuring instrument 10. The opposite end of the sleeve 7 has a reduced threaded portion 11 for engagement with a locking sleeve 12 which has a shoulder 13 for engaging and forcing the end 14 of a flexible hose 15 against shoulder 16 on the end of the sleeve 7. The opposite end of the cable 3 is secured in bore 17 in the reduced end 18 of a movable cylindrically shaped stem 60 having an arm 19 extending from one side thereof for measuring outside diameters and having an arm 20 extending outwardly from the opposite side thereof for measuring inside diameters. The hose 15 has the end 22 thereof connected to a sleeve 23 by means of a spherical handle 24 having a shoulder 25 for forcing the end 22 of the hose 15 against shoulder 26 on the end of a sleeve 23. The handle 24 has a threaded portion 27 for engagement with the threaded end 28 of the sleeve 23. A guiding washer 29 is disposed on the reduced end 18 of the stem 60 to guide it concentrically in the sleeve 23. A washer 31 is secured by set screw 32 to the reduced portion 33 of the stem 60. A stationary cylindrical member 35 is secured to the end of the sleeve 23 and it has an outwardly extending arm 36 parallel with the arm 19 to measure outside diameters in conjunction with the arm 19 and an oppositely extending arm 37 for cooperation with the arm 20 to measure inside diameters. The sleeve 35 has a slotted portion 38 for receiving a pin 39 which extends through an aperture 40 in the stem 60. The pin 39 has an enlarged threaded portion 42 for engagement with a threaded aperture 43 in the beaded portion 44 on a movable sleeve 45. The beaded portion 44 is adapted to be grasped by the fingers to move the stem 60 longitudinally against the force of spring 46 thereby separating the arms 19 and 36 and 20 and 37 respectively to make measurements. A comparatively weak spring 47 is disposed in the hose 15 surrounding the cable 3 to tension the stem 60 and secure it in a predetermined position. The spring 46 is disposed between washers 29 and 31 and the spring 47 is disposed between washer 29 and the connecting member 4.

In operation, it is merely necessary to connect the cable 3 to a longitudinally movable measuring arm 1 of any suitable measuring instrument. The sleeve 45 is then pushed forwardly against the force of the spring 46 which separates the arms 19 and 36 and 20 and 37 respectively so that an inside or an outside measurement may be taken. When the bead 44 on the sleeve 45 is released, the spring 46 urges the arms 19 and 36 and 20 and 37 respectively to a normal closed position. The length of a cylindrical member having reduced ends may be measured by seating the reduced ends in the V-slots 50 and 51.

It will be evident from the foregoing description that I have provided a novel extension which may be of any suitable length for use in conjunction with a measuring instrument having a longitudinally movable measuring arm. My device may be disposed at a remote point to make inside and outside measurements and it may be even bent in arcuate form and still obtain accurate measurements. Pipe thickness may be measured.

Various changes may be made in the specific embodiment of my invention without departing from the spirit thereof or from the scope of the appended claims.

What I claim is:

1. In combination with a measuring device having a longitudinally movable arm and means for indicating the longitudinal movement of said arm, an extension for attachment thereto comprising a cable, means for attaching said cable to said measuring arm for movement therewith, a flexible sleeve covering said cable, a stationary member having a laterally outwardly extending measuring arm attached to one end of said sleeve, a movable member having a laterally outwardly extending arm movable parallel to said first mentioned arm connected to the end of said cable opposite to said measuring device and movable therewith, spring means for tensioning said movable member, and means for moving said movable member manually.

2. An extension as set forth in claim 1 wherein said movable member on the end of said cable has oppositely disposed arms in parallel relationship with parallel arms on said stationary member for measuring inside and outside diameters.

3. In combination with a measuring device having a movable arm and indicating means for indicating the movement of said arm, an extension for attachment thereto comprising a cable, means for attaching said cable to said movable arm, a flexible hose for covering said cable, a sleeve attached to one end of said hose, a stationary member attached to said sleeve having oppositely disposed laterally outwardly extending stationary arms, and a movable member telescopically disposed in said sleeve attached to the end of said cable opposite to said measuring device and movable therewith, laterally outwardly extending arms on said movable member parallel to said stationary arms for measuring inside and outside diameters, a sleeve movable on the outer side of said first mentioned sleeve, a pin extending from said sleeve into said movable member for moving said movable member longitudinally, and spring means for tensioning said movable member.

4. An extension as set forth in claim 3 wherein a spherical shaped handle is disposed on the end of said hose member having means for securing the end of said hose to said sleeve.

5. An extension as set forth in claim 3 wherein said movable member has a washer on one end thereof for guiding it concentrically in said sleeve and a spring is disposed between said washer and said means for connecting said rod and said cable together surrounding said cable.

6. In combination with a measuring device having a movable rod and means for indicating the movement of said rod, an extension for attachment thereto comprising a cable, means for attaching said cable to said measuring rod, a hose covering said cable, a spring surrounding said cable disposed in said hose, a stationary sleeve on one end of said hose having laterally outwardly extending arms, a telescopically disposed member in said sleeve having laterally outwardly extending arms parallel with said stationary arms movable with said cable and manual means for moving said telescopically disposed member longitudinally whereby inside and outside measurements may be taken by said arms.

7. In combination with a measuring device as set forth in claim 6 wherein said parallel arms for measuring outside diameters have aligned V-slots to seat the reduced ends of a member to be measured.

KASIMIER W. MOZUR.

REFERENCES CITED

The following references are of record in the file of this patent:

UNITED STATES PATENTS

| Number | Name | Date |
|---|---|---|
| 745,357 | Lanham | Dec. 1, 1903 |
| 1,472,284 | Sweet et al. | Oct. 30, 1923 |

FOREIGN PATENTS

| Number | Country | Date |
|---|---|---|
| 3,779 | Germany | Feb. 4, 1879 |
| 546,130 | Germany | Mar. 10, 1932 |